US012259744B2

(12) United States Patent
Björninen et al.

(10) Patent No.: US 12,259,744 B2
(45) Date of Patent: Mar. 25, 2025

(54) JOYSTICK HAVING HEIGHT ADJUSTABLE BUTTON OR SWITCH

(71) Applicant: Deere & Company, Moline, IL (US)

(72) Inventors: Ulla Björninen, Tampere (FI); Vesa Siltanen, Tampere (FI); Sami Hörkkö, Tampere (FI)

(73) Assignee: DEERE & COMPANY, Moline, IL (US)

( * ) Notice: Subject to any disclaimer, the term of this patent is extended or adjusted under 35 U.S.C. 154(b) by 29 days.

(21) Appl. No.: 18/169,943

(22) Filed: Feb. 16, 2023

(65) Prior Publication Data
US 2023/0305589 A1    Sep. 28, 2023

(30) Foreign Application Priority Data
Mar. 25, 2022  (EP) ..................... 22164314

(51) Int. Cl.
G05G 9/047       (2006.01)
A01G 23/00       (2006.01)
G05G 1/01        (2008.04)

(52) U.S. Cl.
CPC ............. *G05G 9/047* (2013.01); *A01G 23/00* (2013.01); *G05G 1/01* (2013.01); *G05G 2009/04774* (2013.01)

(58) Field of Classification Search
CPC ................ G05G 9/047; G05G 2009/04774
See application file for complete search history.

(56) References Cited

U.S. PATENT DOCUMENTS

| 6,932,183 | B2 * | 8/2005 | Jeppe .................... G05G 9/047 180/333 |
| 7,293,625 | B2 * | 11/2007 | Kumazawa ......... F15B 13/0422 74/471 XY |
| 7,635,045 | B2 | 12/2009 | Shearer et al. |
| 8,380,402 | B2 | 2/2013 | Hobenshield |
| 10,137,366 | B1 * | 11/2018 | Quesnel .................. A63F 13/98 |
| 10,656,658 | B2 | 5/2020 | Theander |
| 10,815,643 | B2 * | 10/2020 | Wuisan .................... G05G 1/06 |
| 2002/0184735 | A1 * | 12/2002 | Gillman ................ G05G 9/047 16/110.1 |

(Continued)

FOREIGN PATENT DOCUMENTS

| AT | 11940 U1 | 7/2011 |
| BR | 9703643 A | 7/1998 |

(Continued)

OTHER PUBLICATIONS

Extended European Search Report and Written Opinion issued in European Patent Application No. 22164314.1, dated Sep. 22, 2022, in 09 pages.

*Primary Examiner* — Victor L MacArthur
*Assistant Examiner* — Gregory T Prather

(57) ABSTRACT

The disclosed embodiment is a control surface for use in a forest machine. The control surface includes a base panel, wherein the base panel comprises multiple buttons and/or switches to be used with an operators hand. A joystick protruding from the base panel. The joystick includes a handle part. The handle part has multiple buttons and/or switches to be used with an operator's hand. The handle part has a thumb button/switch to be used by an operator's thumb. The thumb button is adjustable in the height position in relation to the base.

12 Claims, 3 Drawing Sheets

(56) References Cited

U.S. PATENT DOCUMENTS

| | | | | |
|---|---|---|---|---|
| 2006/0021819 A1* | 2/2006 | Shearer | ............... | E02F 9/2004 |
| | | | | 180/321 |
| 2018/0253158 A1 | 9/2018 | Chen et al. | | |
| 2021/0318713 A1* | 10/2021 | Case | ...................... | E02F 3/841 |
| 2023/0132572 A1* | 5/2023 | Nesmeev | ................. | G05G 5/03 |
| | | | | 74/471 XY |

FOREIGN PATENT DOCUMENTS

| | | | | | |
|---|---|---|---|---|---|
| FR | | 2895534 A1 * | 6/2007 | ............ | E02F 9/2004 |
| WO | WO2005062151 A1 | | 7/2005 | | |

* cited by examiner

JOYSTICK HAVING HEIGHT ADJUSTABLE BUTTON OR SWITCH

CROSS REFERENCE TO RELATED APPLICATIONS

This application claims priority under 35 U.S.C. § 119 to European patent application EP 22164314.1, filed on 25 Mar. 2022, the disclosure of which is incorporated herein by reference.

FIELD OF THE DISCLOSURE

The present disclosure generally relates to a height adjustable joystick button or switch adapted for the use in forestry vehicles.

BACKGROUND OF THE DISCLOSURE

In forestry machines, such as harvester or forwarders, multiple functions of the boom and the attached tools are controllable by hand control surfaces. The operator uses both hands to use control surfaces, ideally attached to the operator seat to manipulate the crane and/or the working tool attached to it Operators of forest machinery are working in ergonomically challenging conditions, ergonomic hazards concern especially neck, arms, and cervical spine. Work related ergonomic stressors are often caused by suboptimal position, and typical repetitive, short-cycle movement patterns with hands.

It is an object of the present disclosure to reduce the impact of ergonomically challenging conditions.

SUMMARY OF THE DISCLOSURE

The control surface is adapted for use in a forestry machine. The control surface comprises of a base panel having a joystick. The base panel comprises of multiple buttons or switches to be used with an operator's hand. The joystick protrudes from the base panel. The joystick comprises a handle part with multiple buttons or switches to be used with an operator's hand. The handle part has a thumb button or switch to be used by an operator's thumb. The thumb position is adjustable in the height position in relation to the base.

The thumb button or switch may be adjustable in relation to the handle part.

The thumb button or switch may be held by screws in the handle part.

The handle part may provide an elongated hole, so that the thumb button or switch is adjustable in a vertical direction relative to the base panel and to the handle part.

The screws holding the thumb button or switch in the handle part may be accessible from the outer surface of the handle part.

The screws may be each located in a vertically elongated hole in the handle part.

The control surface usually comprises of a flat base panel with protruding switches or buttons which are used by the operator's fingers excluding the thumb. For operation, the operator extends his palm and finger over the base for use. In parallel, the control surfaces also comprise a joystick being vertically arranged at the base panel so that the operator can choose, depending on the necessary control input, to use the joystick with its own buttons or switches or to use the base panel buttons or switches.

A button joystick allows the operator to control the boom with joystick and press one of the buttons located on the joystick without the need to reposition one's hand or arm. There are so many button-operated functions in forestry machines that programming all of them to the 10 available buttons with sequences patterns would cause too much cognitive load to the operator. A hybrid use, a combination of the use of joystick buttons as well as the base panel buttons has to be taken into consideration when designing the joystick with buttons.

The hybrid use is not possible at the time when the hand is vertically oriented holding the joystick. In the vertical hand positions, the operator's fingers are around the joystick and fingertips placed on joystick buttons, the thumb is placed on a special switch, called z-switch. In that hand position, reaching the base panel buttons requires extreme ulnar deviation of the hand and extension of the fingers and reverse movements to reach back to the joystick buttons. During a work shift, the operator usually has to repeat this unergonomic movement dozens of times which would cause fatigue and even pain.

The disclosed embodiment aims to provide a control surface which overcomes these problems.

The disclosed embodiment provides a control surface, having a base panel, the base panel comprising multiple buttons and/or switches to be used with an operators hand, having a joystick protruding from the base panel, the joystick comprising a handle part, the handle part, having multiple buttons and/or switches to be used with an operators hand, the handle part having a thumb button/switch to be used by an operators thumb, the thumb button being adjustable in the height position in relation to the base.

For hybrid use, the operator will orientate the hand somewhat more horizontally and place two (to three) fingers on joystick buttons. In the more horizontal orientation of the hand, the thumb position on z-switch depends highly on individual physical dimensions of the operator's hand. Since thumb is on the z-switch constantly, the thumb position has a great effect on the joystick movement experience and on the operator's ability to control the boom.

The disclosed embodiment provides an adjustable thumb button or z-switch, so that it offers a control surface which is adaptable to the operator's physiological needs. Adjusting the z-switch allows more flexibility in hand position and finger placement and the operator has more freedom to position his hands in the way that suits his operating style and physical dimensions the best. The adjustability provides a relief for the operator's hand and improves the working conditions, reducing the repeated overstretching of the hands, as well as overexertion of the related muscles. At the same time, it provides the operator with more precise tactile feedback enabling a more intuitive control of the vehicle, coordinating the crane and the working tool.

In another embodiment the thumb button/switch is adjustable in relation to the handle part.

The handle part being more exposed on top of the joystick offers a convenient location to adjust the height or vertical distance from the base panel. The handle part stays in the same position, so that the side buttons on the joystick also remain in the same distance to the base panel. This simplifies the use of the control surface.

In a further embodiment the thumb button/switch is held by screws in the handle part.

The fixation by screws does not require complicated changes to the existing design. The screws allow easy changes with present tools in a timely manner.

In another embodiment the handle part provides an elongated hole, so that the thumb button/switch is adjustable in a vertical direction relative to the base panel and to the handle part.

The cutout or hole represents the maximum adjustment length for the thumb button/switch.

This opening provides still structural integrity to the handle part.

In a further embodiment the screws holding the thumb button/switch in the handle part are accessible from the outer surface of the handle part.

The accessibility allows for an easy and fast change of the position of the thumb button/switch.

In another embodiment the screws are each located in a vertically elongated hole in the handle part.

The operator can easily understand the position of the screws and the thumb button/switch. The individual position of the screws can easily be reproduced without the need for repositioning.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments may include any combination of features from one or more dependent claims, and such features may be incorporated, collectively or separately, into any independent claim.

DETAILED DESCRIPTION

Figure 1:
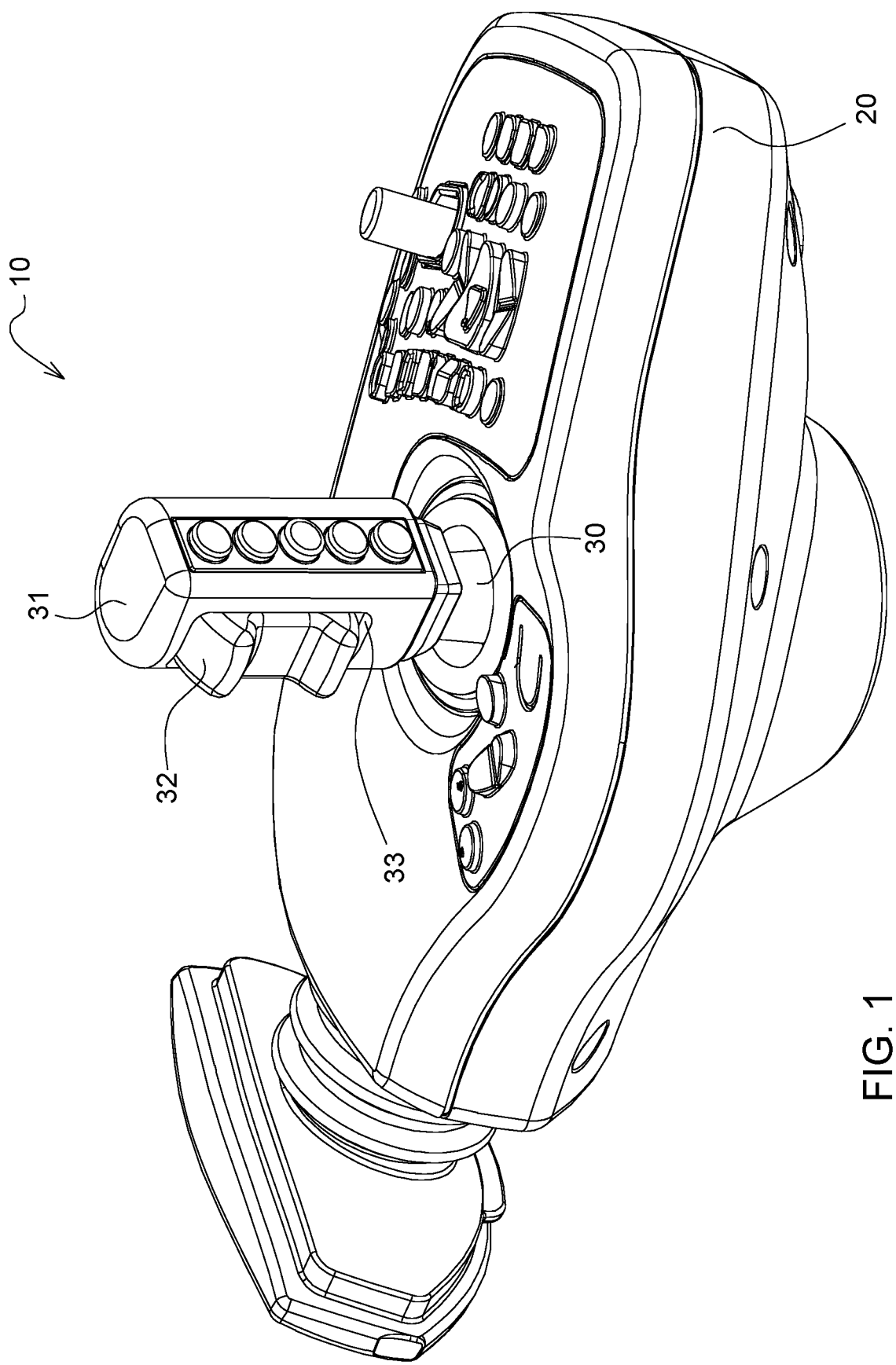
FIG. 1 depicts an isometric view of one embodiment with the thumb button/switch.

FIG. 1 depicts a view of the control surface 10 from a front-side direction. The control surface 10 has a base plate and panel 20. A joystick 30 or lever element is provided in a center portion of the base plate for the use with the operator's left or right hand. A handle part 31 is attached to the joystick element 30.

The base panel 20 extend around the joystick 30 and has multiple keys or buttons to allow to bind functions or text input to them. The keys and buttons on the base panel 20 are used with the operator's fingers except the thumb. The operator extends the hand palm over the base panel 20 to reach the intended keys or buttons.

The handle part 31, attached to an upward of the joystick element 30 has shape with rounded edges so that it is ergonomically adapted to be used by the operator's hand. On a side surface, usually to be used by the operator's fingers except the thumb, there is a row of buttons provided in a vertical orientation. These buttons can be programmed with various functions of the forest machine, e.g., for the crane operation or the tool control.

The control surface has a thumb button/switch 32 on another side surface of the handle part 31 to be exclusively used by the operator's thumb. Usually, the thumb button 32 comprises a three-way switch, to be able to switch between an upward movement, downward movement and no movement in a middle position. The handle part 31 has a cut out or hole to position the thumb switch in the handle part 31. The hole has an elongated shape which extends further in a vertical direction than the size of the thumb button 32 to enable a vertical adjustment of the thumb button 32.

It is possible to adjust the vertical position of the thumb button 32 on the handle part 31, so that at the same time the operator uses the base panel buttons, it is possible to use the thumb switch on the handle part 31 without moving the fingers away from the base panel 20. The operator adjusts the vertical position of the thumb switch to the best position depending on the hand reach and can work with reduced fatigue.

Figure 2:
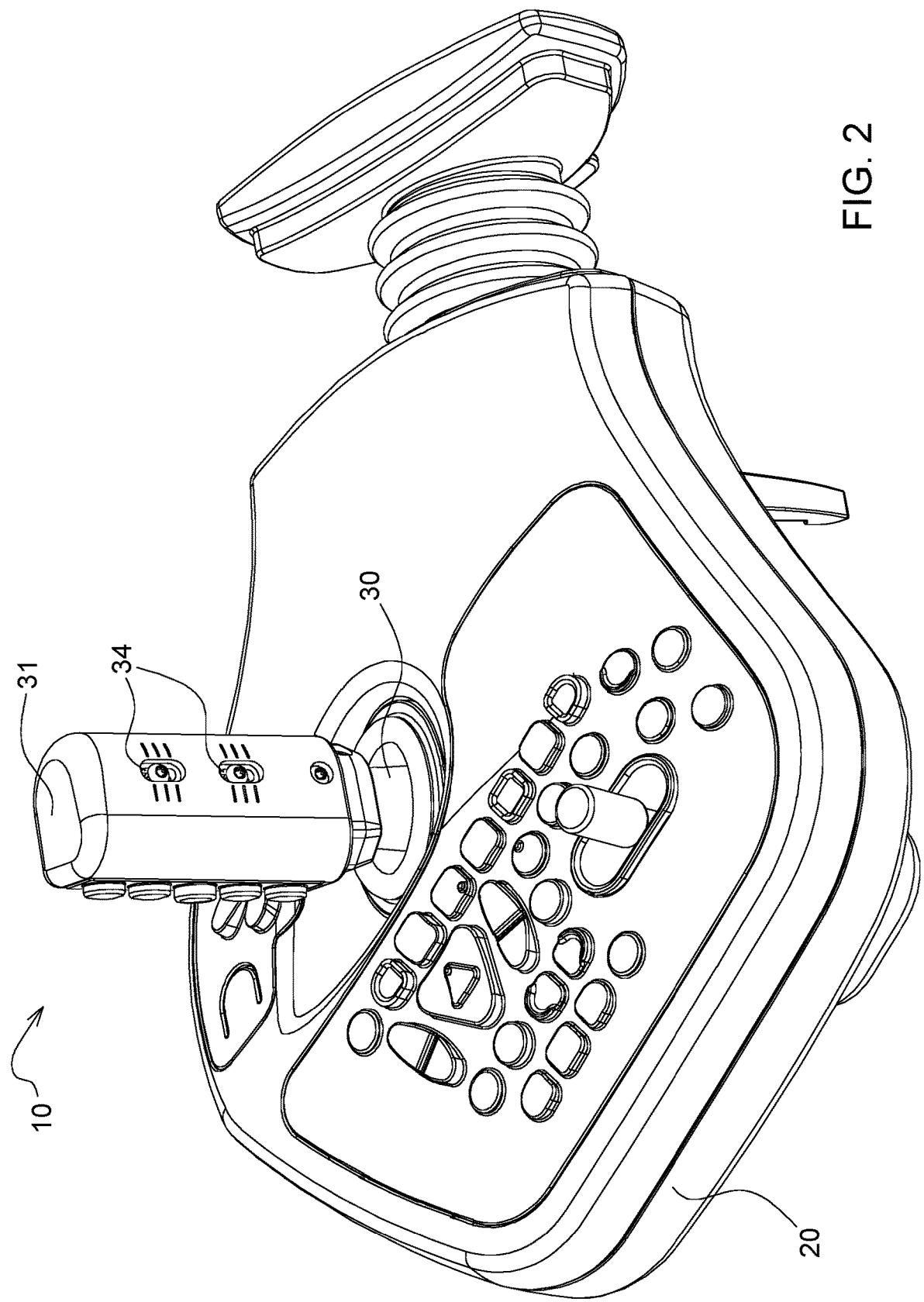
FIG. 2 shows an embodiment with a backside in an isometric view.

FIG. 2 shows another embodiment view depicting another side surface of the handle part 31. The base panel 20 is corresponding to the base panel 20 of FIG. 1. The handle part 31 is mounted on the joystick element 30 by at least a screw connection. The side surface of the handle part 31 has also at least two screw connections to fix the thumb button 32 to the handle part 31. The screw holes can have an elongated shape in a vertical direction relative to the base panel 20 to enable the movement of the thumb button 32 when the screws are in loose connection and to fix the thumb button 32 by tightening the screws at a certain vertical position in the slots or elongated holes 34. The handle part 31 may have markings along the vertical extension of the screw holes to present an easy repeatability of the screw position for different operator positions of the thumb button 32. The surface of the handle part 31 where the screw heads are in surface contact can also be of a rough surface to improve easy positioning.

Figure 3:
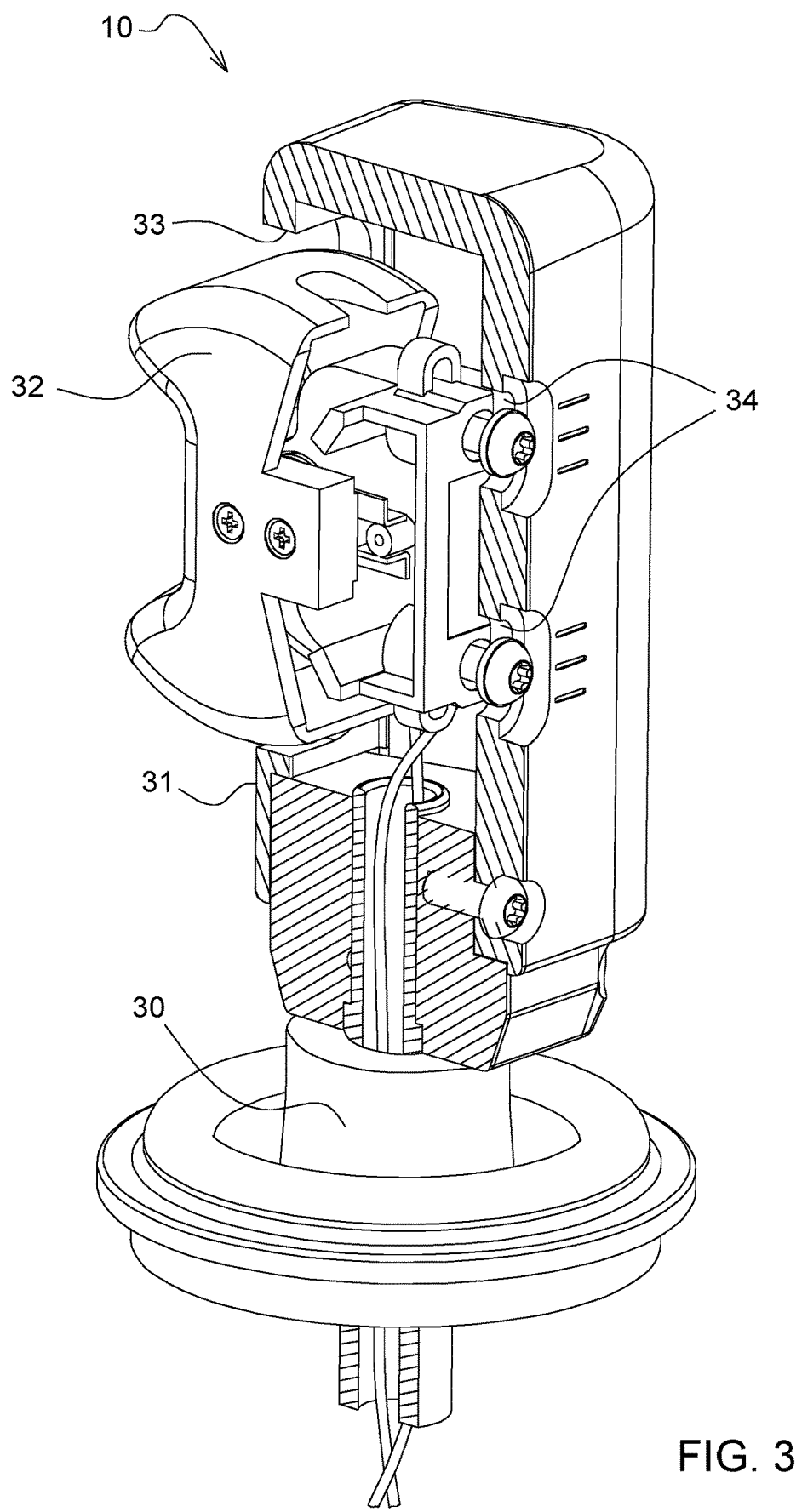
FIG. 3 shows a cut view of the hand part.

The embodiment of FIG. 3 shows a cut view of the handle part 31 exposing the thumb button/switch 32 inside the handle part 31 and its positioning. The joystick element 30 is corresponding to FIGS. 1 and 2. The base panel 20 is omitted. The thumb button 32 is held inside the handle part 31 by screws which are extending from a back side of the thumb button 32, and which are adjustable from an outside of the handle part 31. The handle part 31 has elongated holes 34 for the screws. The thumb button 32 can be moved vertically to an intended position. On the opposite side surface of the handle part 31 the thumb button 32 contact surface reaches through the elongate opening to be able to be used by the operator. The elongated hole 33 reflects the vertical positioning of the elongated screw holes and represents the complete reach of the vertical positioning.

The joystick element 30 has a center hole to guide the necessary cable connections from a controller to the thumb switch and the side buttons of the handle part 31. The cables are omitted in FIG. 3.

The handle part 31 also has markings next to the screw holes to make the repetitive positioning of the thumb button 32 more precise for the operator. As each forest vehicle is used by different operators, the markings provide an advantageous method to find the optimum position.

The thumb button switch 32 can have a different button arrangement or be simply a single push button or multiple different buttons as long as these are adjustable in the vertical position relative to the base panel 20 or the handle part 31.

Various features are set forth in the following claims.

What is claimed is:

1. A control surface for use in a work machine, the control surface comprising:

a base panel, the base panel comprising more than one base button/switch to be used with an operator's hand; and a joystick protruding from the base panel, the joystick comprising a handle part, the handle part having more than one handle button/switch to be used with an operator's hand, the handle part having a thumb button/switch to be used with an operator's thumb wherein the thumb button/switch is adjustable in a vertical direction in relation to the base panel;

wherein the thumb button/switch is held by screws in the handle part; and wherein the screws are each located in a respective vertically elongated hole in the handle part.

2. The control surface of claim 1, wherein the thumb button/switch is adjustable in relation to the handle part.

3. The control surface of claim 1, wherein the handle part provides an elongated hole, so that the thumb button/switch is adjustable in the vertical direction relative to the base panel and to the handle part.

4. The control surface of claim 1, wherein the screws holding the thumb button/switch in the handle part are accessible from the outer surface of the handle part.

5. A control surface for use in a work machine, the control surface comprising:

a base panel, the base panel comprising more than one base button/switch to be used with an operator's hand; and a joystick protruding from the base panel, the joystick comprising a handle part, the handle part having more than one handle button/switch to be used with an operator's hand, the handle part having a thumb button/switch to be used with an operator's thumb wherein the thumb button/switch is adjustable in a vertical direction in relation to the base panel between a plurality of operator positions providing ergonomic selection;

wherein the thumb button/switch is held by at least one fastener in the handle part, and wherein the at least one fastener is located in a vertically elongated hole in the handle part permitting the ergonomic selection of the operator positions in the vertical direction.

6. The control surface of claim 5, wherein the thumb button/switch is adjustable in relation to the handle part.

7. The control surface of claim 5, wherein the handle part provides an elongated hole, so that the thumb button/switch is adjustable in the vertical direction relative to the base panel and to the handle part.

8. The control surface of claim 5, wherein the screws holding the thumb button/switch in the handle part are accessible from the outer surface of the handle part.

9. A work machine, comprising:

a control surface including a base panel, the base panel comprising more than one base button/switch to be used with an operator's hand; and a joystick protruding from the base panel, the joystick comprising a handle part, the handle part having more than one handle button/switch to be used with an operator's hand, the handle part having a thumb button/switch to be used with an operator's thumb wherein the thumb button/switch is adjustable in a vertical direction in relation to the base panel between a plurality of operator positions providing ergonomic selection;

wherein the thumb button/switch is held by at least one fastener in the handle part, and wherein the at least one fastener is located in a vertically elongated hole in the handle part permitting the ergonomic selection of the operator positions in the vertical direction.

10. The work machine of claim 9, wherein the thumb button/switch is adjustable in relation to the handle part.

11. The work machine of claim 9, wherein the screws holding the thumb button/switch in the handle part are accessible from the outer surface of the handle part.

12. The work machine of claim 9, wherein the handle part provides an elongated hole, so that the thumb button/switch is adjustable in the vertical direction relative to the base panel and to the handle part.

\* \* \* \* \*